US012295468B2

(12) United States Patent
Kang et al.

(10) Patent No.: US 12,295,468 B2
(45) Date of Patent: May 13, 2025

(54) ELECTRONICE DEVICE CASE WITH OPENING AND CLOSING STURCTURE

(71) Applicant: SAMSUNG ELECTRONICS CO., LTD., Suwon-si (KR)

(72) Inventors: Yoonseok Kang, Suwon-si (KR); Yongbum Kim, Suwon-si (KR); Kyungyub Lee, Suwon-si (KR); Changhyung Lee, Suwon-si (KR); Hwangyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 518 days.

(21) Appl. No.: 17/518,781

(22) Filed: Nov. 4, 2021

(65) Prior Publication Data

US 2022/0183432 A1 Jun. 16, 2022

Related U.S. Application Data

(63) Continuation of application No. PCT/KR2021/014755, filed on Oct. 20, 2021.

(30) Foreign Application Priority Data

Dec. 16, 2020 (KR) ........................ 10-2020-0176668

(51) Int. Cl.
*A45C 11/00* (2006.01)
*A45C 13/00* (2006.01)
(Continued)

(52) U.S. Cl.
CPC ............ *A45C 11/00* (2013.01); *A45C 13/005* (2013.01); *A45C 13/1069* (2013.01); *H04R 1/02* (2013.01); *A45C 2011/001* (2013.01)

(58) Field of Classification Search
CPC ... A45C 11/00; A45C 13/005; A45C 13/1069; A45C 2011/001; H04R 1/02; H04R 1/10;
(Continued)

(56) References Cited

U.S. PATENT DOCUMENTS 10,397,683 B2 8/2019 LeBlanc et al.
11,115,746 B1 * 9/2021 Morrison ............ H04R 1/1025
(Continued)

FOREIGN PATENT DOCUMENTS

CN 110417089 A 11/2019
CN 209710282 U 11/2019
(Continued)

OTHER PUBLICATIONS

International Search Report (PCT/ISA/210) issued Jan. 28, 2022 by the International Searching Authority in International Application No. PCT/KR2021/014755.
(Continued)

*Primary Examiner* — Eugene Yun
(74) *Attorney, Agent, or Firm* — Sughrue Mion, PLLC

(57) ABSTRACT

An electronic device case is provided. The electronic device case includes a first body, a first connection part coupled to the first body, a second body, a second connection part coupled to the second body and movably connected to the first connection part, an accommodating space formed by the first body and the second body, a first magnet fixed on the first connection part and including a first portion, and a second magnet fixed on the second connection part and including a second portion having a same polarity as the first portion. The electronic device case is transitioned, by movement of the second connection part with respect to the first connection part, to a first state in which the accommodating space is opened, and a second state in which the accommodating space is closed.

15 Claims, 18 Drawing Sheets

(51) Int. Cl.
*A45C 13/10* (2006.01)
*H04R 1/02* (2006.01)

(58) Field of Classification Search
CPC ................ H04R 2460/17; B65D 43/22; B65D 2313/04; H01F 7/02
USPC ....................................................... 455/575.8
See application file for complete search history.

(56) References Cited

U.S. PATENT DOCUMENTS

| | | | |
|---|---|---|---|
| 2003/0179880 | A1 | 9/2003 | Pan et al. |
| 2016/0105050 | A1* | 4/2016 | Chan ......................... G06F 1/26 361/752 |
| 2017/0094399 | A1 | 3/2017 | Chandramohan et al. |
| 2018/0367883 | A1 | 12/2018 | Minoo et al. |
| 2019/0069066 | A1 | 2/2019 | Song et al. |
| 2020/0383215 | A1 | 12/2020 | Kim et al. |
| 2021/0058687 | A1 | 2/2021 | Liu |
| 2021/0337303 | A1* | 10/2021 | Macomber ............... H04R 1/10 |
| 2022/0107666 | A1 | 4/2022 | Kim et al. |

FOREIGN PATENT DOCUMENTS

| | | | |
|---|---|---|---|
| CN | 210609640 | U | 5/2020 |
| CN | 210783233 | U | 6/2020 |
| CN | 111601210 | A | 8/2020 |
| CN | 111988697 | A | 11/2020 |
| KR | 10-2017-0039570 | A | 4/2017 |
| KR | 10-2019-0021033 | A | 3/2019 |
| KR | 10-2020-0033001 | A | 3/2020 |
| KR | 10-2020-0137896 | A | 12/2020 |

OTHER PUBLICATIONS

Written Opinion (PCT/ISA/237) issued Jan. 28, 2022 by the International Searching Authority in International Application No. PCT/KR2021/014755.
Communication dated Feb. 28, 2024 issued by the European Patent Office in European Application No. 21906824.4.
Communication dated Sep. 19, 2024 from the Korean Intellectual Property Office in Korean Patent Application No. 10-2020-0176668.

* cited by examiner

ELECTRONICE DEVICE CASE WITH OPENING AND CLOSING STURCTURE

CROSS-REFERENCE TO RELATED APPLICATION(S)

This application is a bypass continuation of International Application No. PCT/KR2021/014755, filed on Oct. 20, 2021, in the Korean Intellectual Property Receiving Office, which is based on and claims priority to Korean Patent Application No. 10-2020-0176668, filed on Dec. 16, 2020, in the Korean Intellectual Property Office, the disclosure of which is incorporated by reference herein in its entirety.

TECHNICAL FIELD

The disclosure generally relates to an electronic device case in which an electronic device including an opening/closing structure can be accommodated.

BACKGROUND ART

An electronic device case may refer to a case capable of accommodating an electronic device. The electronic device case may protect an electronic device, which is accommodated therein, from external foreign materials or impacts. In addition, the electronic device case may perform various functions, such as charging the electronic device accommodated therein or making it possible to utilize a function of the electronic device accommodated therein.

Electronic devices currently available on the market have no terminals (e.g., 3.5 mm terminals) for connection with audio devices, and there has been extensive development regarding wireless audio devices in line with the increasing importance of wireless convenience. Wireless audio devices may be connected to electronic devices through a communication network based on Bluetooth, for example.

There has also been extensive development regarding electronic device cases capable of accommodating such wireless audio devices.

DISCLOSURE OF INVENTION

Technical Problem

Electronic device cases in the related art include cases configured to maintain opened and closed states by a magnetic force. Such a case separately includes a magnet for maintaining the case in the open state and a magnet for maintaining the case in the closed state.

Multiple magnets used in this manner may increase the manufacturing cost. There are also problems in that the electronic device may be damaged by the magnetic force. Furthermore, foreign materials having magnetic components frequently attach near the parts on which magnets are arranged.

Magnets arranged on existing electronic device cases solely perform the function of maintaining the opened and closed state of the cases, and do not play any role of assisting the case opening or closing process.

An electronic device case according to various embodiments disclosed herein may solve the above-mentioned problems.

Solution to Problem

According to an aspect of the disclosure, an electronic device case may include: a first body; a first connection part coupled to the first body; a second body; a second connection part coupled to the second body and movably connected to the first connection part; an accommodating space formed by the first body and the second body; a first magnet fixed on the first connection part, the first magnet including a first portion; and a second magnet fixed on the second connection part, the second magnet including a second portion, wherein the first portion of the first magnet and the second portion of the second magnet have a same polarity, the electronic device case is transitioned, by movement of the second connection part with respect to the first connection part, to a first state in which the accommodating space is opened, a second state in which the accommodating space is closed, and a third state between the first state and the second state, and in the third state, the first magnet and the second magnet are positioned such that the first portion of the first magnet and the second portion of the second magnet are aligned to face each other.

In the first state, the first magnet and the second magnet may be positioned such that the first portion of the first magnet and the second portion of the second magnet are misaligned from each other, and the first state is maintained by a repulsive force acting between the first magnet and the second magnet, and in the second state, the first magnet and the second magnet may be positioned such that the first portion of the first magnet and the second portion of the second magnet are misaligned with each other and the second state is maintained by a repulsive force acting between the first magnet and the second magnet.

Each of the first magnet and the second magnet may be a bar magnet, and in the third state, the first magnet and the second magnet may be positioned such that a first surface of the first portion of the first magnet and a second surface of the second portion of the second magnet are parallel to each other.

The first state and the second state, the first magnet and the second magnet may be positioned such that a first surface of the first portion of the first magnet and a second surface of the second portion of the second magnet face different directions.

The first magnet may include a first groove provided in a surface thereof, the first connection part may include a first protrusion inserted in the first groove of the first magnet, the second magnet may include a second groove provided in a surface thereof, and the second connection part may include a second protrusion inserted in the second groove of the second magnet.

The first groove of the first magnet may be offset from a center of the first magnet, and the second groove of the second magnet may be offset from a center of the second magnet.

The electronic device case may further include an opening/closing sensor provided on the first connection part and configured to generate different signals according to the first state, the second state, and the third state based on a change in a magnetic field.

The electronic device case may further include a foreign material storage space provided between the first connection part and the second connection part.

A first surface of the second connection part may protrude farther than a second surface of the second magnet such that the foreign material storage space is surrounded by the first connection part, the second connection part, and the second magnet.

The electronic device case may further include a first buffer member provided on least one of the first connection part and the second connection part at a position corresponding to where the first connection part and the second connection part are in contact with each other in the first state.

The electronic device case may further include a second buffer member provided on at least one of the first connection part and the second connection part at a position corresponding to where the first connection part and the second connection part are in contact with each other in the second state.

The electronic device case may further include a hinge shaft, wherein each of the first magnet and the second magnet has a hole at a central portion thereof and through which the hinge shaft passes, each of the first magnet and the second magnet is a circular magnet comprising first regions having a first polarity and second regions having a second polarity that is different than the first polarity, the first regions and the second regions are alternately arranged in a circumferential direction, and the first magnet and the second magnet are arranged to face each other.

The first magnet may include a first groove provided in a surface thereof, the first connection part may include a first protrusion inserted in the first groove of the first magnet to fix the first magnet to the first connection part, the second magnet may include a second groove provided in a surface thereof, and the second connection part may include a second protrusion inserted in the second groove of the second magnet to fix the second magnet to the second connection part.

In the third state, a first region of the first magnet and a first region of the second magnet may be aligned to face each other.

In the first state and the second state, a first region of the first magnet and a first region of the second magnet may be aligned to face each other.

According to an aspect of the disclosure, an electronic device case may include: a first body; a first connection part coupled to the first body; a second body; a second connection part coupled to the second body and movably connected to the first connection part; an accommodating space formed by the first body and the second body; a first bar magnet fixed on the first connection part, the first bar magnet including a first portion having a first polarity and a second portion having a second polarity; and a second bar magnet fixed on the second connection part, the second bar magnet including a first portion having the first polarity and a second portion having the second polarity, wherein the first portion of the first bar magnet and the first portion of the second bar magnet face each other at a first point on a path along which the second connection part moves with respect to the first connection part, and the first portion of the first bar magnet and the first portion of the second bar magnet face different directions at a second point where the second connection part can no longer move with respect to the first connection part.

The first bar magnet may include a first groove provided in a surface thereof, the first connection part may include a first protrusion inserted in the first groove of the first bar magnet, the second bar magnet may include a second groove provided in a surface thereof, and the second connection part may include a second protrusion inserted in the second groove of the second bar magnet.

The first groove of the first bar magnet may be offset from a center of the first bar magnet, and the second groove of the second bar magnet may be offset from a center of the second bar magnet.

The electronic device case may further include an opening/closing sensor fixed on the first connection part such that relative position of the opening/closing sensor with respect to the second bar magnet is changed by movement of the second connection part relative to the first connection part, wherein the opening/closing sensor is configured to detect a change in a magnetic field.

According to an aspect of the disclosure, an electronic device case may include: a first body; a first connection part coupled to the first body; a second body; a second connection part coupled to the second body and connected to the first connection part; an accommodating space formed by the first body and the second body; a hinge shaft passing through the first connection part and the second connection part, wherein the second connection part is rotatable with respect to the first connection part on the hinge shaft; a first circular magnet having a hole at a central portion thereof and through which the hinge shaft passes, wherein the first circular magnet comprises first regions having a first polarity and second regions having a second polarity that is different than the first polarity, the first regions and the second regions are alternately arranged along a circumferential direction of the first circular magnet, and the first circular magnet is fixed on the first connection part; and a second circular magnet having a hole at a central portion thereof and through which the hinge shaft passes, wherein the second circular magnet includes first regions having the first polarity and second regions having the second polarity, the first regions and the second regions are alternately arranged along a circumferential direction of the second circular magnet, and the second circular magnet is fixed on the second connection part, the first regions of the first circular magnet and the first regions of the second circular magnet face each other in a state where boundaries of the first regions of the first circular magnet and boundaries of the first regions of the second magnet coincide with each other, at a first point on a path along which the second connection part rotates with respect to the first connection part, and the first regions of the first circular magnet and the first regions of the second circular magnet face each other in a state where the first regions of the first circular magnet and the first regions of the second circular magnet are misaligned with each other at a predetermined angle, at a second point of the path where the second connection part can no longer move with respect to the first connection part.

Advantageous Effects of Invention

According to various embodiments disclosed herein, a minimum magnet configuration alone makes it possible to perform both a function of maintaining the opened and closed state of a case and a function of assisting the opening or closing process.

BRIEF DESCRIPTION OF DRAWINGS

The above and other aspects, features, and advantages of certain embodiments of the present disclosure will be more apparent from the following description taken in conjunction with the accompanying drawings, in which.

BEST MODE FOR CARRYING OUT THE INVENTION

Figure 1:
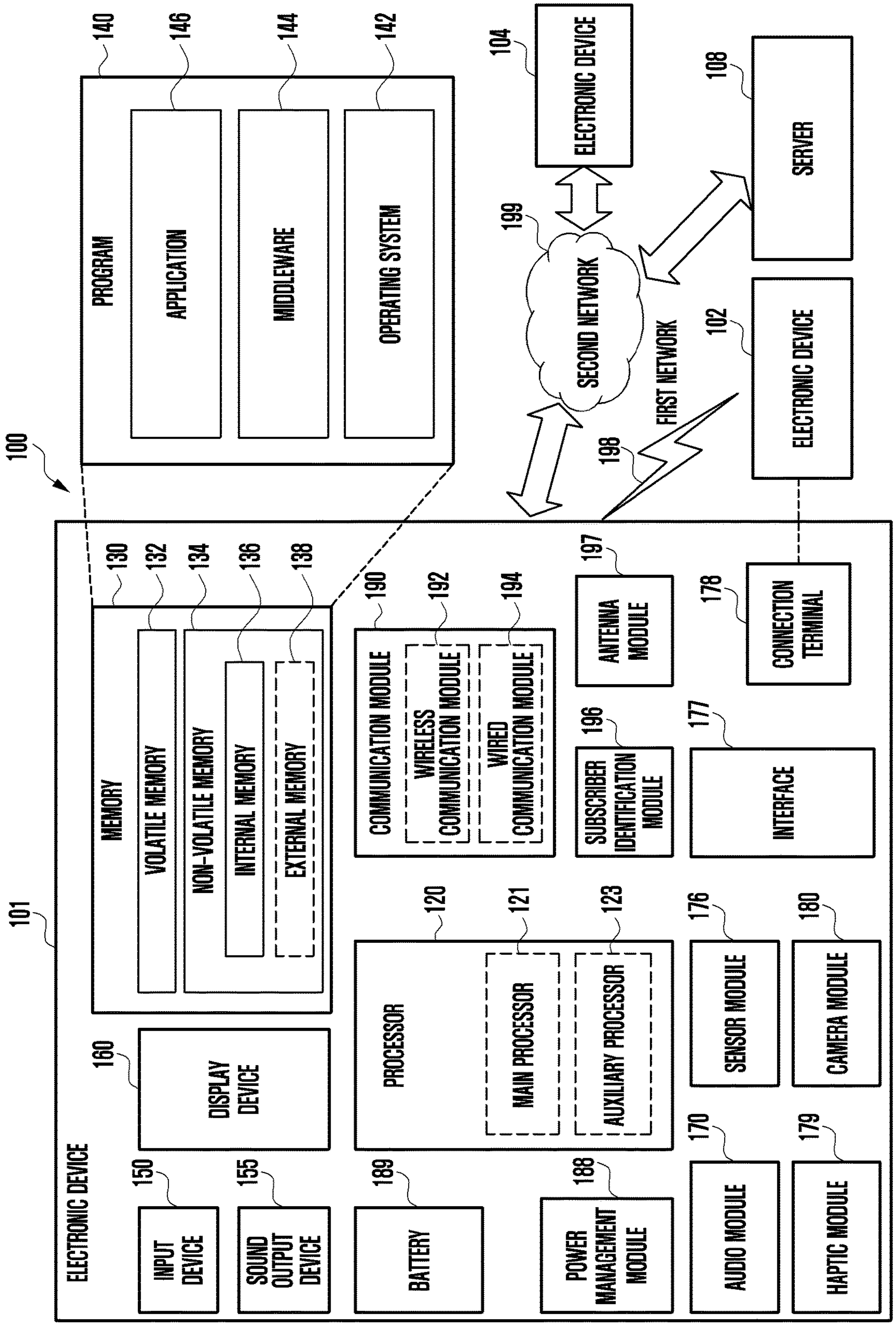
FIG. 1 is a block diagram of an electronic device in a network environment according to an embodiment.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wire), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., via a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., via wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPIq)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device case described below may be a case in which various types of electronic devices including an electronic device 101 illustrated in FIG. 1 can be accommodated.

In one embodiment, the electronic device accommodated in the electronic device case may be an audio device. The audio device may be a device including at least one speaker. The audio device may include a connection terminal configured to support a wired connection and/or a communication module for wireless connection to be connected to the electronic device in a wired or wireless manner. For example, the communication module of the audio device may support a near field communication (NFC) network, such as Bluetooth, wireless fidelity (WiFi) direct, or infrared data association (IrDA), or a telecommunications network, such as a legacy cellular network, a 5G network, a next-generation communication network, the Internet, or a computer network (e.g., LAN or WAN). The audio device may be wirelessly connected to the electronic device through a communication module capable of supporting such a communication protocol. The audio device connected to the electronic device by wired or wireless connection may receive an audio signal of the electronic device. The audio device may output a received audio signal through a speaker.

In the drawings included herein, for convenience of description, the electronic device accommodated in the electronic device case is referred to as an audio device. However, the descriptions on the drawings do not limit the type of the electronic device accommodated in the electronic device case. In addition to the audio device, various types of electronic devices may be accommodated in the electronic device case.

Figure 2:
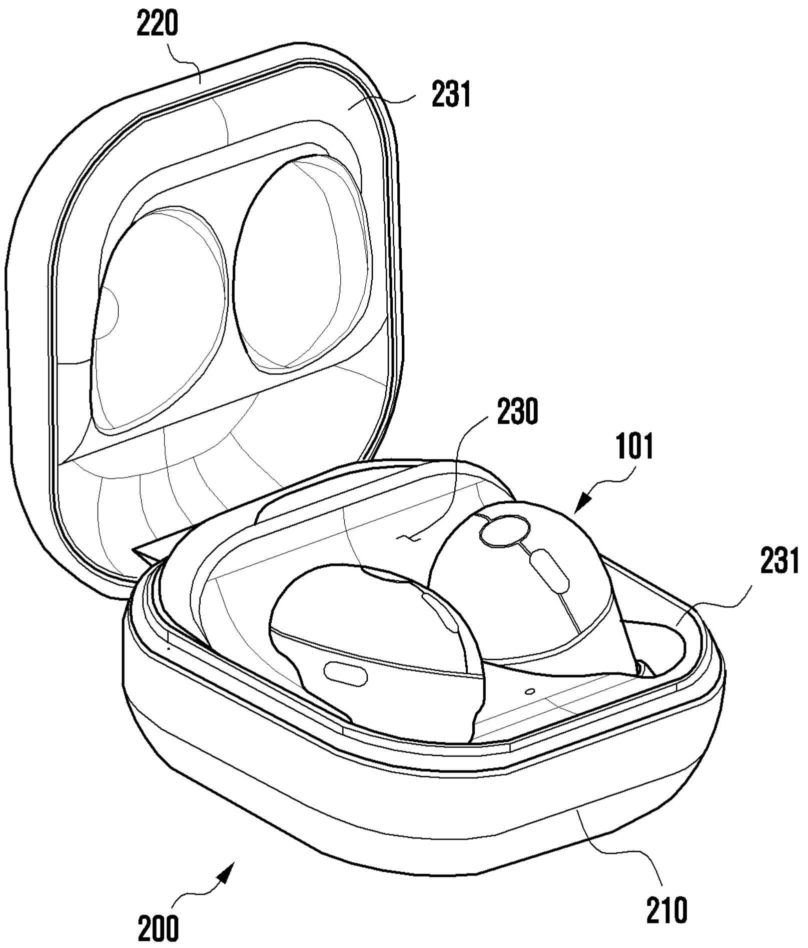
FIG. 2 is a diagram of an electronic device case and an electronic device accommodated in the electronic device case according to an embodiment.

FIG. 2 is a diagram of an electronic device case and an electronic device accommodated in the electronic device case according to an embodiment.

According to various embodiments, an electronic device case 200 may include a first body 210 and a second body 220. An accommodating space 230 may be formed inside the first body 210 and the second body 220. The electronic device 101 may be accommodated in the accommodating space 230 to be stored therein. A seating part 231 formed in a shape corresponding to the outer shape of the electronic device 101 may be disposed in the accommodating space 230 so that the electronic device 101 may be seated in the accommodating space 230 in a fixed state. In one embodiment, at least a portion of the seating part 231 may be formed of a material that can be elastically deformed, so as to support the electronic device 101. For example, at least a portion of the seating portion 231 may be formed of an elastically deformable material, such as rubber or PORON.

According to various embodiments, the first body 210 and the second body 220 may be connected to be movable relative to each other. According to the movement of the second body 220 relative to the first body 210, the accommodation space 230 may be cut off from the outside or may communicate with the outside. The accommodating space 230 may accommodate the electronic device 101 in a state in which the electronic device 101 communicates with the outside (e.g., an opened state). The accommodating space 230 may be cut off from the outside due to movement of the second body 220 relative to the first body 210 (e.g., a closed state), and accordingly, the electronic device 101 may be accommodated in the electronic device case 200.

According to various embodiments, the electronic device case 200 may include a battery, and a connection interface electrically connected to the battery. The connection interface may refer to a component configured to support an electrical connection between the electronic device 101 and the battery while the electronic device 101 is accommodated in the electronic device case 200. The connection interface may be formed of a conductive material for electrical connection with the electronic device 101. For example, the connection interface may include a component configured to support an electrical connection, such as a pogo-pin.

The components of the electronic device case 200 described above are merely examples, and some of the above-described components may be omitted or modified within a range that those of ordinary skill in the art can understand. For example, the battery and connection interface may be omitted.

Figure 3A:
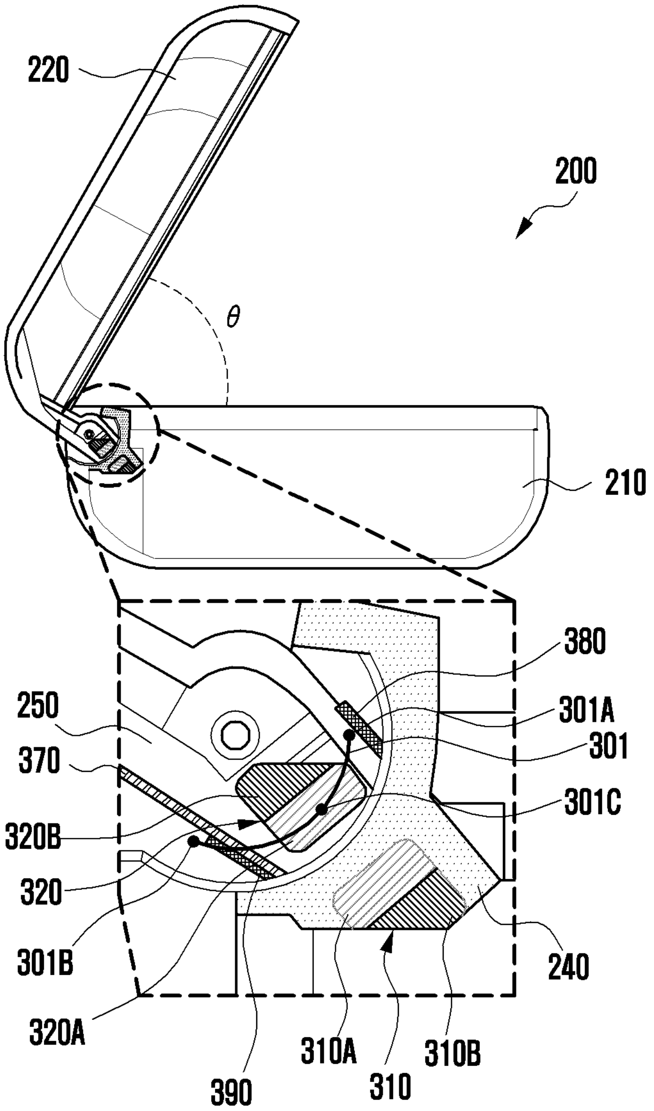
FIGS. 3A, 3B and 3C are diagrams illustrating a positional relationship between components according to an operating state of an electronic device case according to an embodiment.
Figure 3B:
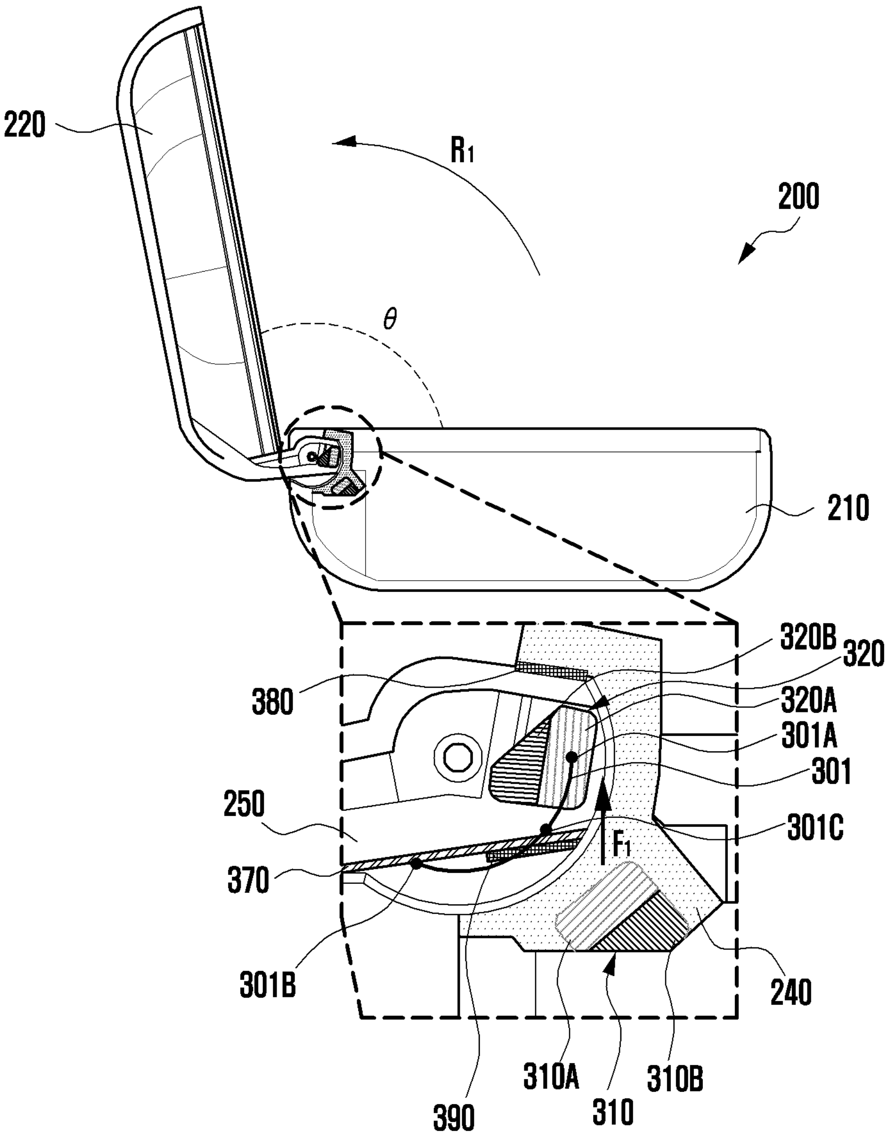
Figure 3C:
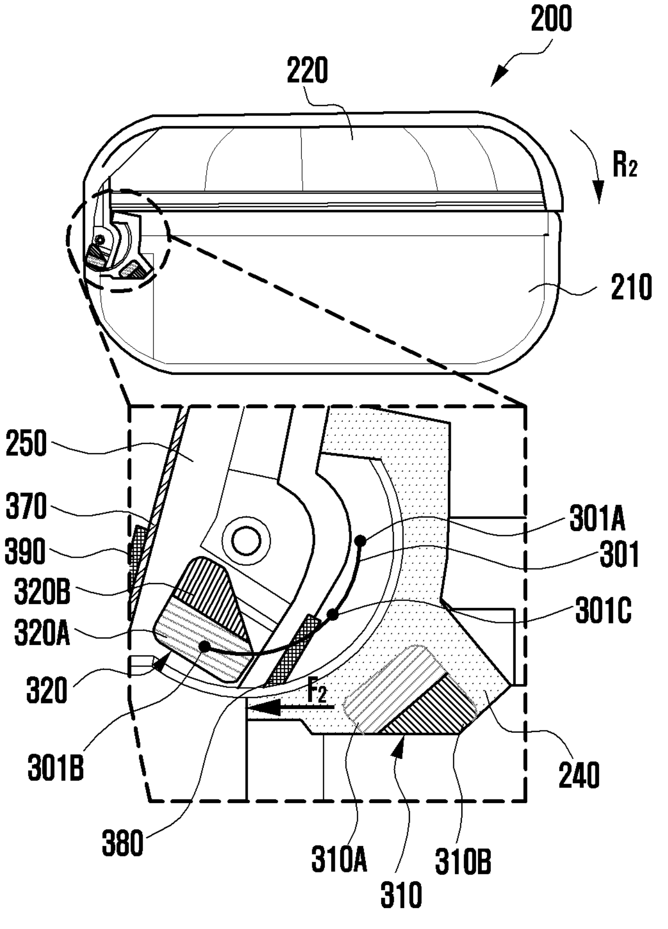

FIGS. 3A, 3B and 3C are diagrams illustrating a positional relationship between components according to an operating state of an electronic device case according to an embodiment.

According to various embodiments, a first connection part 240 may be coupled to the first body 210. The first connection part 240 may be integrally formed with the first body 210, or may be separately formed to be coupled to the first body 210 in various ways.

According to various embodiments, a second connection part 250 may be coupled to the second body 220. The second connection part 250 may be integrally formed with the second body 220, or may be separately formed to be coupled to the second body 220 in various ways.

According to various embodiments, the second connection part 250 may be connected to the first connection part 240 to be movable relative thereto. When the second connection part 250 moves relative to the first connection part 240, the second body 220 coupled to the second connection part 250 may move relative to the first body 210 coupled to the first connection part 240. Here, the movement may include both a linear movement and a non-linear movement. In one embodiment, the second connection part 250 may be connected to the first connection part 240 through a hinge connection.

According to various embodiments, a first magnet 310 may be fixed (e.g., fixedly installed, adhered, mounted, disposed, attached, formed on/in, etc.) on the first connection part 240. The first magnet 310 may include various types of magnets. For example, as shown in FIGS. 3A to 3C, the first magnet 310 may be in the form of a bar magnet. The first magnet 310 may include a first portion 310A having a first polarity (e.g., N pole), and a second portion 310B having a second polarity (e.g., S pole).

According to various embodiments, a second magnet 320 may be fixed on the second connection part 250. The second magnet 320 may include various types of magnets. For example, as shown in FIGS. 3A to 3C, the second magnet 320 may be in the form of a bar magnet. The second magnet 320 may include a first portion 320A having a first polarity (e.g., N pole), and a second portion 320B having a second polarity (e.g., S pole).

According to various embodiments, the first magnet 310 is fixed on the first connection part 240, and the second magnet 320 may be fixed on the second connection part 250, such that a positional relationship between the first magnet 310 and the second magnet 320 may change when the second connection part 250 moves relative to the first connection part 240.

According to various embodiments, an opened or closed state of an accommodating space (e.g., the accommodating space 230 of FIG. 2) surrounded by the first body 210 and the second body 220 may change due to movement of the second connection part 250 with respect to the first connection part 240. Hereinafter, a state in which the accommodating space is fully opened is referred to as a first state (e.g., the state illustrated in FIG. 3B), a state in which the accommodating space is completely closed is referred to as a second state (e.g., the state illustrated in FIG. 3C), and an intermediate state between the first state and the second state is referred to as a third state (e.g., the state illustrated in FIG. 3A). In another embodiment, the first state may refer to a state having the largest angle θ between the first body 210 and the second body 220, the second state may refer to a state having the smallest angle θ between the first body 210 and the second body 220, and the third state may refer to an intermediate state between the first state and the second state, having an angle greater than the angle of the second state and less than the angle of the first state. In still another embodiment, based on a path 301 through which the second connection part 250 moves with respect to the first connection part 240, the first state and the second state may refer to when the second connection part 250 reaches points 301A and 301B, respectively, at which the second connection part 240 can no longer move with respect to the first connection part 240, and the third state may refer to a state where the second connection part 250 is located at any other point on the path 301 (e.g., point 301C) along which the second connection part 240 moves with respect to the first connection part 240.

According to various embodiments, as shown in FIG. 3A, the first magnet 310 and the second magnet 320 may be arranged in the third state such that the respective portions 310A and 320A that have the same polarity face each other. The first portion 310A of the first magnet 310, having a first polarity, and the first portion 320A of the second magnet 320, having the first polarity, may face each other. Here, facing each other may refer to a first surface of the first portion 310A of the first magnet 310 and a first surface of the first portion 320A of the second magnet 320 being substantially parallel to each other. As shown in FIG. 3A, the first portion 310A of the first magnet 310 and the second portion 310B of the second magnet 320 may face each other at a specific point 301C in the movement path 301 of the second connection part 250. In the third state, the first magnet 310 and the second magnet 320 may face each other such that the respective portions 310A and 320A thereof having the same polarity are closest to each other. In the third state, the repulsive force acting between the first magnet 310 and the second magnet 320 may be greatest. Depending on the direction of a force slightly applied to the second body 220 while in the third state, the accommodating space may transition to be fully opened (first state) or the accommodating space may transition to be completely closed (second state).

For example, when the electronic device case 200 has crossed the third state in a transition process to the opened state (first state) from the closed state (second state), the electronic device case 200 may be transitioned to the first state by a repulsive force between the first magnet 310 and the second magnet 320 even without external force applied to the electronic device case 200. In addition, when the electronic device case 200 has crossed the third state in a transition process to the closed state (second state) from the opened state (first state), the electronic device case 200 may be transitioned to the second state by a repulsive force between the first magnet 310 and the second magnet 320 even without external force applied to the electronic device case 200.

According to various embodiments, as shown in FIGS. 3B and 3C, in the first state and the second state, the first magnet 310 and the second magnet 320 may be disposed such that the respective portions 310A and 320A that have the same polarity are misaligned from each other. That is, the first surface of the first portion 310A of the first magnet 310 and the first surface of the first portion 320A of the second magnet 320 may be disposed to face different directions. In this state, the repulsive force acting between the first magnet 310 and the second magnet 320 may allow the first state and the second state to be maintained. For example, referring to FIG. 3B, the repulsive force (F1) may act between the first magnet 310 and the second magnet 320 in the first state. In the first state, the repulsive force (F1) acting between the first magnet 310 and the second magnet 320 may be transferred to the second connection part 250 to act in a direction (R1) in which the electronic device case 200 is opened. Since the path along which the second connection part 250 can move with respect to the first connection part 240 is limited, the repulsive force (F1) acting between the first magnet 310 and the second magnet 320 may enable the electronic device case 200 to maintain the first state. Referring to FIG. 3C, the repulsive force (F2) may act between the first magnet 310 and the second magnet 320 in the second state. In the second state, the repulsive force (F2) acting between the first magnet 310 and the second magnet 320 may be transferred to the second connection part 250 to act in the direction R2 in which the electronic device case 200 is closed. Since the path along which the second connection part 250 can move with respect to the first connection part 240 is limited, the repulsive force acting between the first magnet 310 and the second magnet 320 may enable the electronic device case 200 to maintain the second state.

As described herein, the electronic device case 200 may be configured to maintain the first state and the second state only with the first magnet 310 and the second magnet 320 without a separate magnet for maintaining the first state and/or the second state. In summary, the first magnet 310 and the second magnet 320 may provide a driving force in an opening direction (e.g., R1 in FIG. 3B) or closing direction (e.g., R2 in FIG. 3C) of the electronic device case 200 to assist an opening or closing process and allow the electronic device case 200 to maintain the opening and closing thereof.

According to various embodiments, buffer members may be disposed on at least one of the first connection part 240 and the second connection part 250. Buffer members may include a first buffer member 380 disposed on the first connection part 240 and a second buffer member 390 disposed on the second connection part 250. The first buffer member 380 and the second buffer member 390 may be formed of an elastically deformable material. For example, the buffer members 380 and 390 may be formed of a material such as rubber or PORON. In one embodiment, the first buffer member 380 may be disposed on at least one of the first connection part 240 and the second connection part 250 such that the same can be disposed on a portion where the first connection part 240 and the second connection part 250 are in contact with each other in the first state. When the electronic device case 200 is transitioned to the first state, the first buffer member 380 may absorb the impact caused by the collision between the first connection part 240 and the second connection part 250 to alleviate the impact caused by the collision between the first connection part 240 and the second connection part 250. In one embodiment, the second buffer member 390 may be disposed on at least one of the first connection part 240 and the second connection part 250 such that the same can be disposed on a portion where the first connection part 240 and the second connection part 250 are in contact with each other in the second state. When the electronic device case 200 is transitioned to the second state, the second buffer member 390 may absorb the impact caused by the collision between the first connection part 240 and the second connection part 250 to alleviate the impact caused by the collision between the first connection part 240 and the second connection part 250. The impact applied to the first connection part 240 and the second connection part 250 may be reduced by the buffer members even when the electronic device case 200 is transitioned to the first state or the second state, thereby improving the durability of the electronic device case 200.

According to various embodiments, a shielding member 370 capable of shielding magnetic force may be disposed the second connection part 250 so that the magnetic field formed by the second magnet 320 is prevented from flowing out to the outside of the electronic device case 200. The shielding member 370 may induce the magnetic field of the second magnet 320 in a direction in which the first magnet 310 is disposed, thereby strengthening the magnetic force acting between the first magnet 310 and the second magnet 320. The shielding member 370 may also be applied to the first connection part 240.

Figure 4:
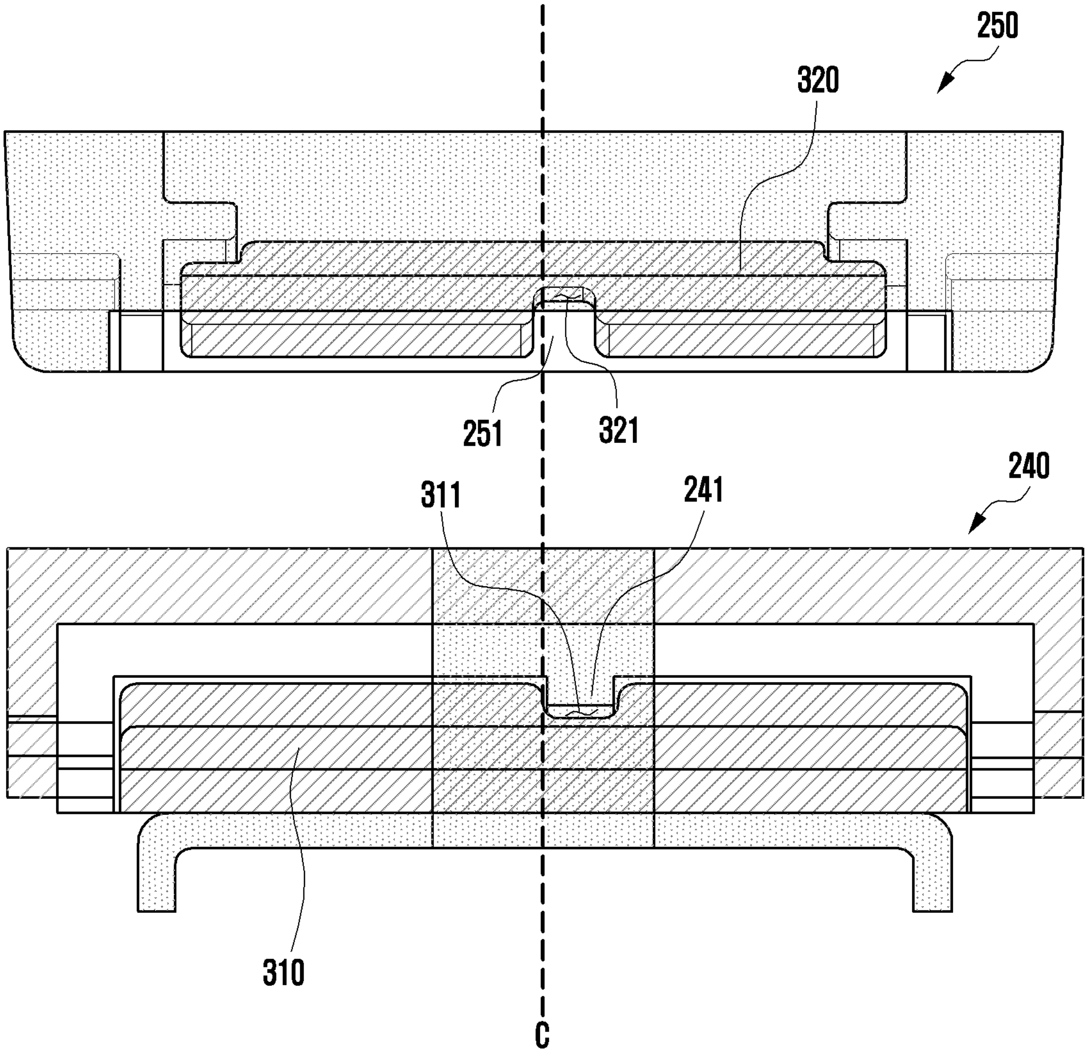
FIG. 4 is a diagram of a coupling relationship between a magnet and a connection part according to an embodiment.

FIG. 4 is a diagram of a coupling relationship between a magnet and a connection part according to an embodiment.

According to various embodiments, a first groove 311 may be formed on the first magnet 310. The first groove 311 may be a recess formed concavely on the first magnet 310. A first protrusion 241 corresponding to the first groove 311 of the first magnet 310 may be formed on the first connection part 240 to which the first magnet 310 is fixed. When the first magnet 310 is placed on the first connection part 240, the first protrusion 241 may be inserted into the first groove 311 of the first magnet 310. The first magnet 310 may be fixed to the first connection part 240 by the corresponding structure of the first groove 311 and the first protrusion 241. In one embodiment, the first groove 311 of the first magnet 310 may be formed at a position spaced apart from the center (C)

of the first magnet 310. Accordingly, since the first groove 311 is not formed symmetrically on the first magnet 310, one direction may be determined in connection with assembling the first magnet 310. For example, when the first magnet 310 is assembled to the first connection part 240 in a different direction instead of in the correct direction, the first groove 311 of the first magnet 310 may not fit into the protrusion formed on the first connection part 240. Thus, misassembly can be prevented by the corresponding structure of the first groove 311 and the first protrusion 241. In another embodiment, the first protrusion 241 may be formed on the first magnet 310, and the first groove 311 may be formed on the first connection part 240.

According to various embodiments, a second groove 321 may be formed on the second magnet 320. The second groove 321 may be a recess formed concavely on the second magnet 320. A second protrusion 251 corresponding to the second groove 321 of the second magnet 320 may be formed on the second connection part 250 to which the second magnet 320 is fixed. When the second magnet 320 is placed on the second connection part 250, the second protrusion 251 may be inserted into the second groove 321 of the second magnet 320. The second magnet 320 may be fixed to the second connection part 250 by the corresponding structure of the second groove 321 and the second protrusion 251. In one embodiment, the second groove 321 of the second magnet 320 may be formed at a position spaced apart from the center (C) of the second magnet 320. Accordingly, since the second groove 321 is not formed symmetrically on the second magnet 320, one direction may be determined in connection with assembling the second magnet 320. For example, when the second magnet 320 is assembled to the second connection part 250 in a different direction instead of in the correct direction, the second groove 321 of the second magnet 320 may not fit into the protrusion formed on the second connection part 250. Thus, misassembly can be prevented by the corresponding structure of the second groove 321 and the second protrusion 251. In another embodiment, the second protrusion 251 may be formed on the second magnet 320, and the second groove 321 may be formed on the second connection part 250.

Figure 5:
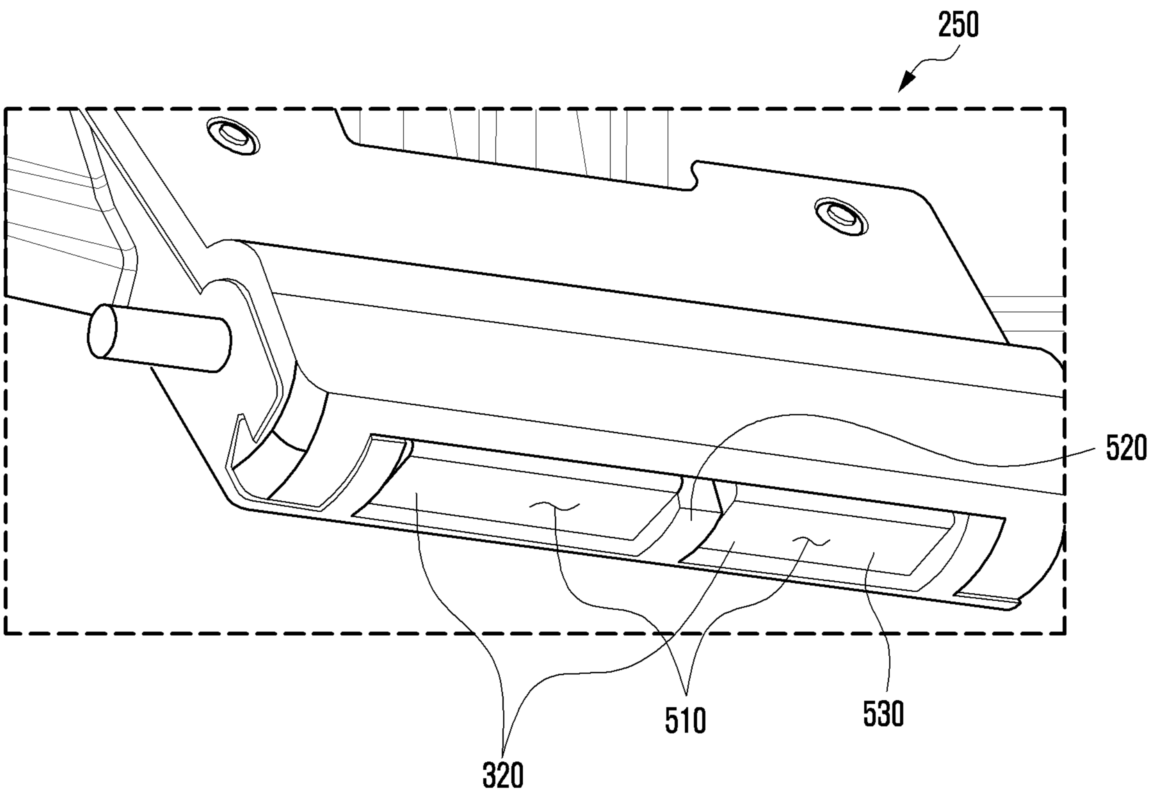
FIG. 5 is a diagram of a connection part according to an embodiment.

FIG. 5 is a diagram of a connection part according to an embodiment.

According to various embodiments, a foreign material storage space 510 may be provided between the first connection part 240 and the second connection part 250. The foreign material storage space 510 may be an additional space capable of storing foreign materials introduced between the first connection part and the second connection part 250. The foreign material storage space 510 may be an additional space to prevent damage to the connection structure of the first connection part 240 and the second connection part 250, which may be caused by a foreign material being introduced between the first connection part 240 and the second connection part 250 in a state in which the second connection part 250 is in close contact with the first connection part 240.

Referring to FIG. 5, a first surface 520 of the second connection part 250 may be formed to protrude farther than a first surface 530 of the second magnet 320. The foreign material storage space 510 may be provided due to the stepped portion formed between the first surface 520 of the second connection part 250 and the first surface 530 of the second magnet 320. In a state in which the first connection part is connected to the second connection part 250, the foreign material storage space 510 may be a space surrounded by the first connection part, the second connection part 250, and the second magnet 320.

Figure 6A:
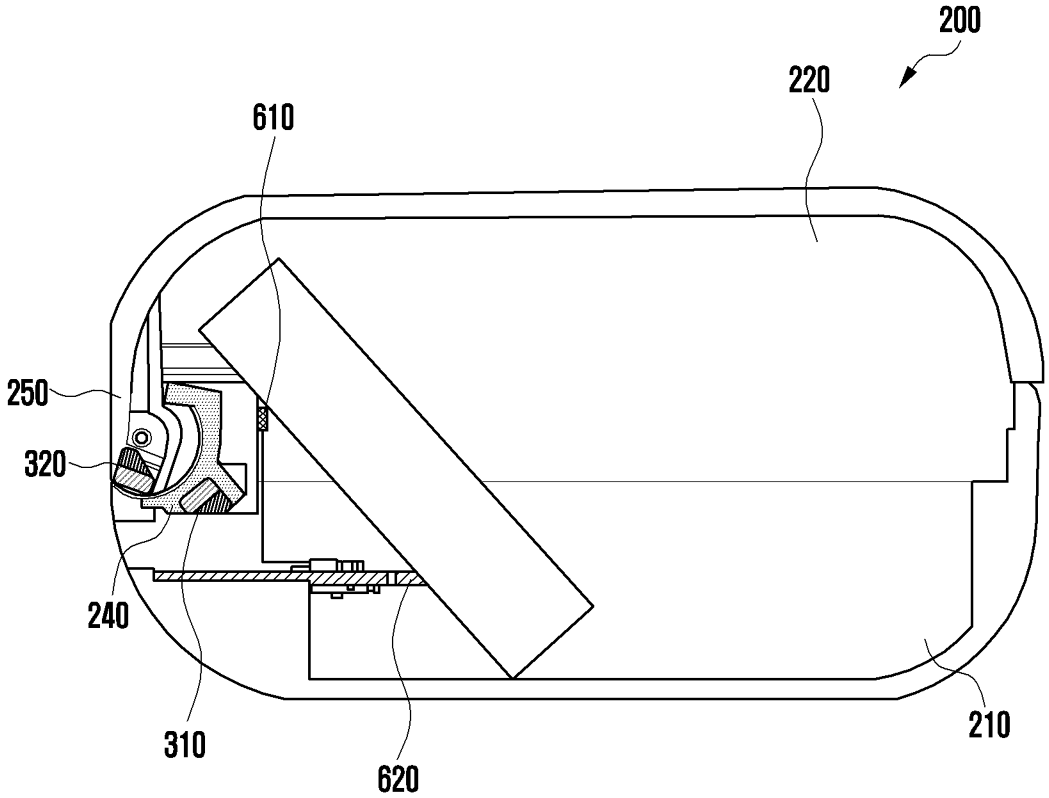
FIGS. 6A and 6B are diagrams illustrating an opening/closing sensor included in an electronic device case according to an embodiment.
Figure 6B:
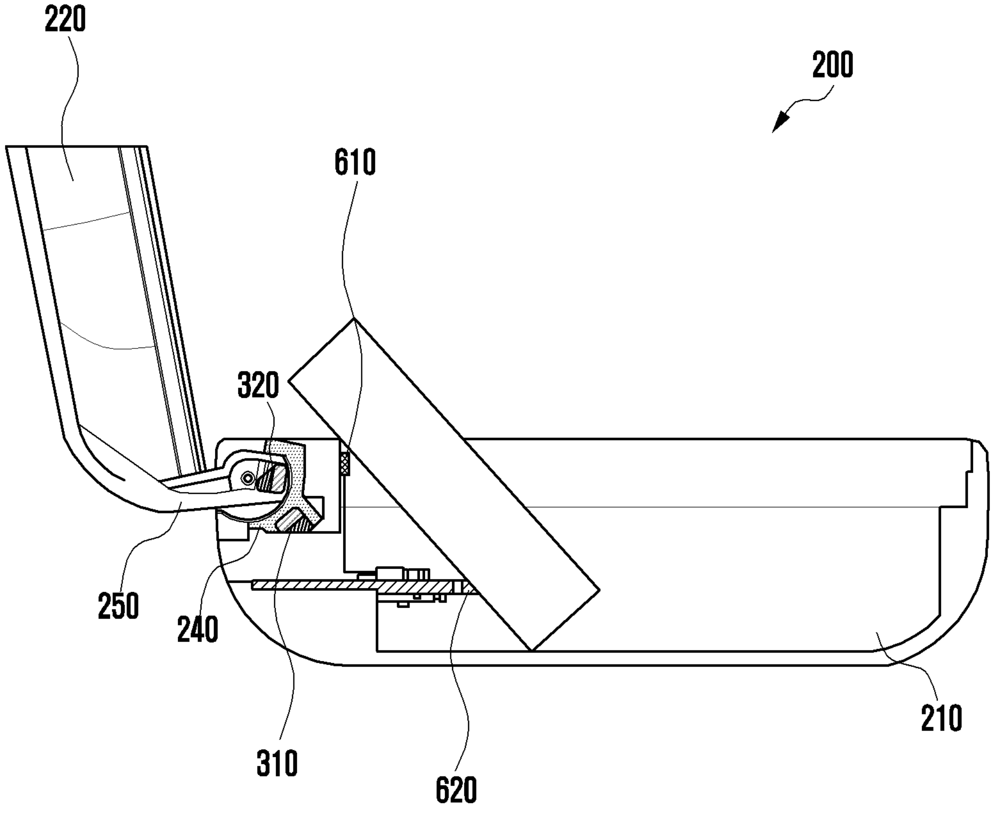

FIGS. 6A and 6B are diagrams illustrating an opening/closing sensor included in an electronic device case according to an embodiment. Since a basic structure of the electronic device case 200 is the same as that of the electronic device case 200 described in FIGS. 3A to 3C, the descriptions related thereto will be omitted.

According to various embodiments, the electronic device case 200 may include an opening/closing sensor 610 configured to generate different electrical signals according to the various states (e.g., the third state shown in FIG. 3A, the first state shown in FIG. 3B, and the second state shown in FIG. 3C) of the electronic device case 200. In one embodiment, the opening/closing sensor 610 may be installed at a position capable of detecting a displacement change according to the relative movement of the second connection part 250 with respect to the first connection part 240. For example, as shown in FIGS. 6A and 6B, the opening/closing sensor 610 may be installed at a position adjacent to the first connection part 240 in the first body 210.

According to various embodiments, the opening/closing sensor 610 may be a Hall sensor 610 that outputs a signal according to changes in a magnetic field. The opening/closing sensor 610 may be electrically connected to a main board 620 of the electronic device case 200.

For example, as shown in FIGS. 6A and 6B, the distance between the opening/closing sensor 610 and the second magnet 320 may be closer when the electronic device case 200 is in the first state (FIG. 6B) than when the same is the second state (FIG. 6A). When the opening/closing sensor 610 is the Hall sensor 610 that senses magnetic field changes, a greater magnetic field change may be detected in the first state, and a smaller magnetic field change may be detected in the second state.

Accordingly, a relative position between the opening/closing sensor 610 and the second magnet 320 may be changed due to movement of the second connection part 250 with respect to the first connection part 240, and the opening/closing sensor 610 may output different signals according to the relative position changes, thereby checking the opened or closed state of the electronic device case 200.

Figure 7:
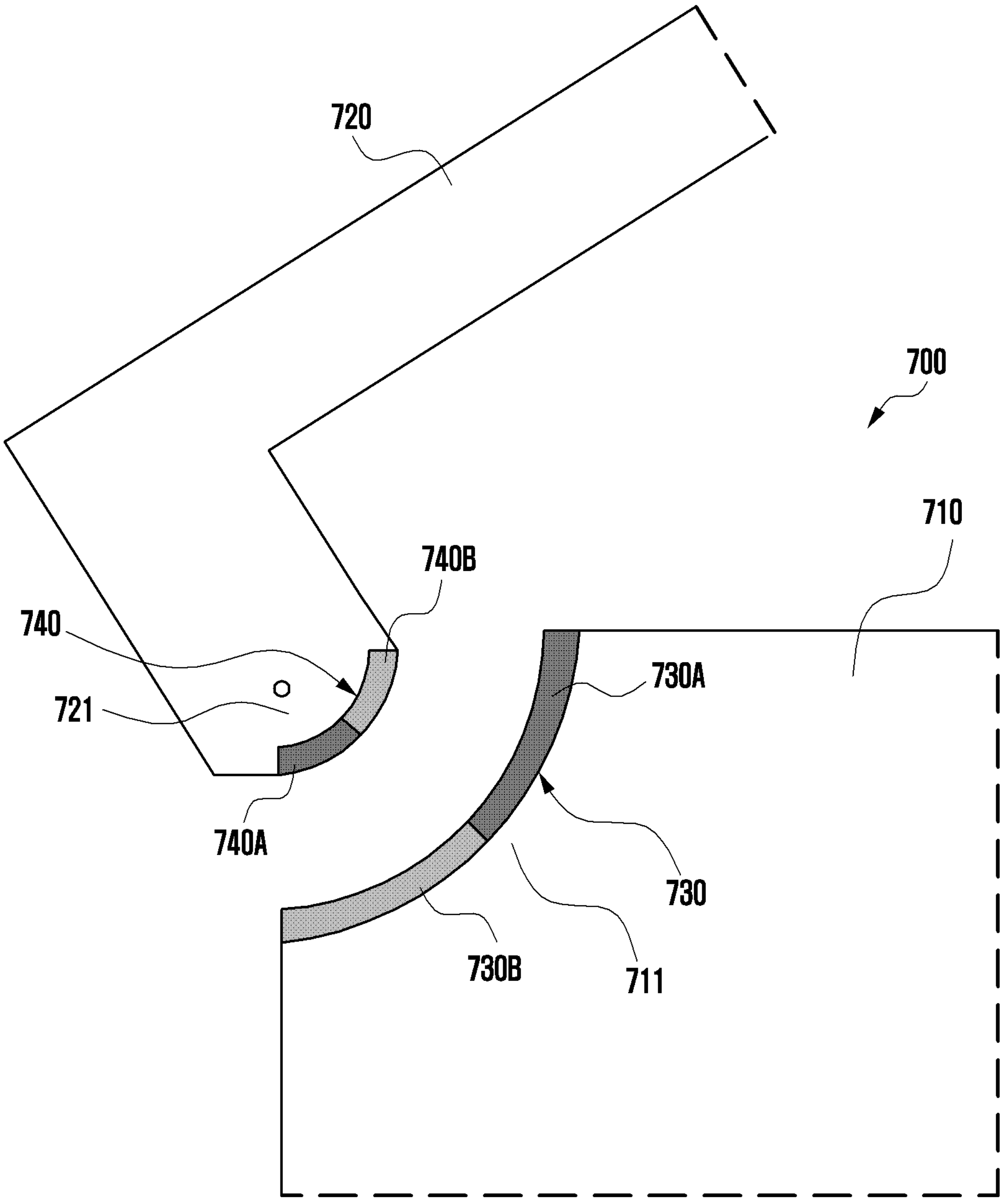
FIGS. 7 and 8 are diagrams of example modifications of an electronic device case according to an embodiment.
Figure 8:
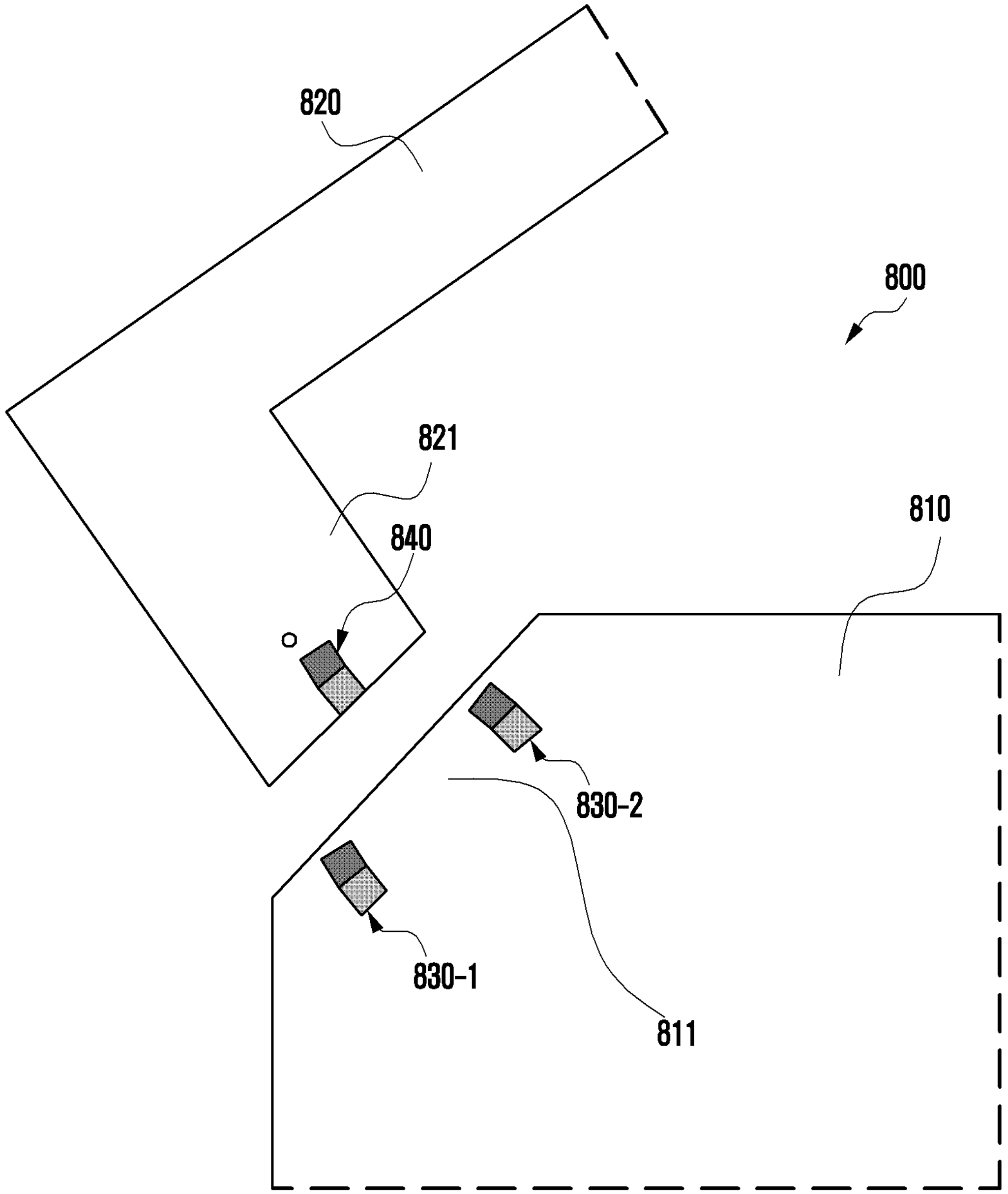

FIGS. 7 and 8 are diagrams of example modifications of an electronic device case according to an embodiment. According to various embodiments, the arrangement and shape of a first magnet 730 or 830 and a second magnet 740 or 840 may be variously changed. Since electronic device cases 700 and 800 shown in FIGS. 7 and 8 are similar to the electronic device case 200 described in FIGS. 3A to 3C, except for the arrangement and shape of the first magnet 730 or 830 and the second magnets 740 or 840, a detailed description related to the operation of the electronic device case 200 will be omitted.

Referring to FIG. 7, the electronic device case 700 may include a first body 710 and a second body 720. The first body 710 and the second body 720 may be relatively moved according to the relative movement of the first connection part 711 and the second connection part 721. In the state shown in FIG. 7, a first portion 730A of the first magnet 730 and a second portion 740B of the second magnet 740 may disposed to face each other, and a second portion 730B of the first magnet 730 and a first portion 740A of the second magnet 740 may be disposed to face each other. The state illustrated in FIG. 7 may correspond to the third state of the electronic device case 200 described with reference to FIG. 3A. In this state, when an external force acts on a second connection part 721 in a direction to open the electronic device case 700, the electronic device case 700 may be naturally transitioned to an opened state (e.g., the first state illustrated in FIG. 3B) by the magnetic force acting between the first magnet 730 and the second magnet 740. In addition, when an external force acts on a second connection part 721 in a direction to close the electronic device case 700, the electronic device case 700 may be naturally transitioned to a closed state (e.g., the second state illustrated in FIG. 3C) by the magnetic force acting between the first magnet 730 and the second magnet 740. The opened state (first state) and the closed state (second state) may be maintained by the repulsive force between the first magnet 730 and the second magnet 740.

Referring to FIG. 8, the electronic device case 800 may include a first body 810 and a second body 820. The first body 810 and the second body 820 may be relatively moved according to the relative movement of the first connecting part 811 and the second connecting part 821. A plurality of first magnets 830-1 and 830-2 may be provided. In the state shown in FIG. 8, a second magnet 840 may be disposed between the two first magnets 830-1 and 830-2. The state shown in FIG. 8 may correspond to the third state of the electronic device case 200 described with reference to FIG. 3A. For example, the third state may refer to an intermediate state between a state in which the electronic device case 800 is fully opened (e.g., the first state illustrated in FIG. 3B) and a state in which the electronic device case 800 is completely closed (e.g., the second state illustrated in FIG. 3C). In the state depicted in FIG. 8, depending on a direction of an external force applied to the second connection part 821, the state may be transitioned to the opened state (e.g., the first state shown in FIG. 3B) or the closed state (e.g., a second state shown in FIG. 3C) by the attractive force acting on one of the first magnets 830-1 and 830-2 and the second magnet 840.

Figure 9:
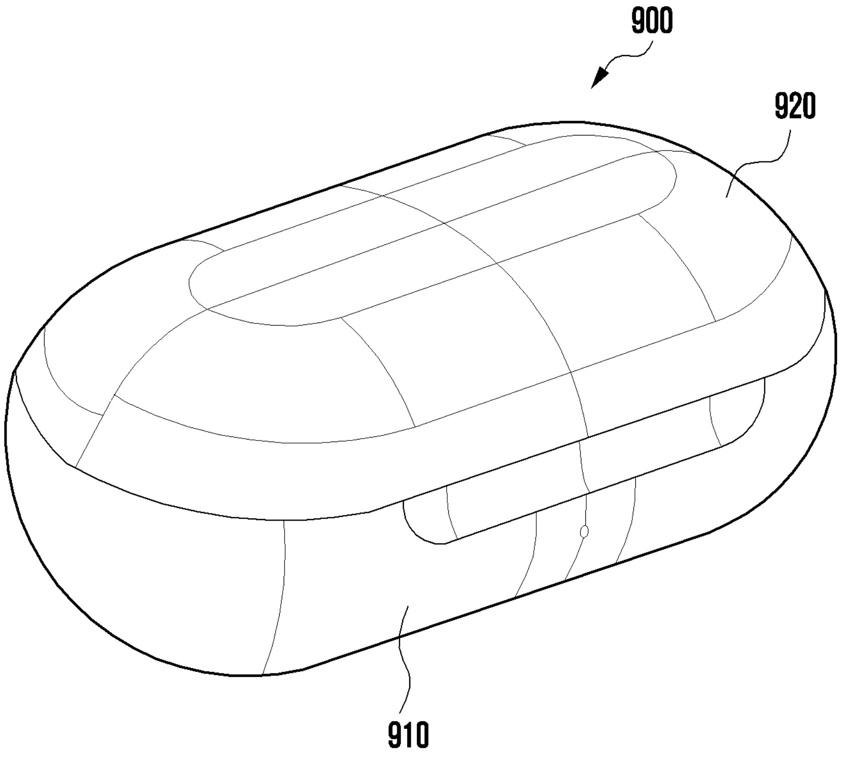
FIG. 9 is a diagram of an electronic device case according to an embodiment.
Figure 10A:
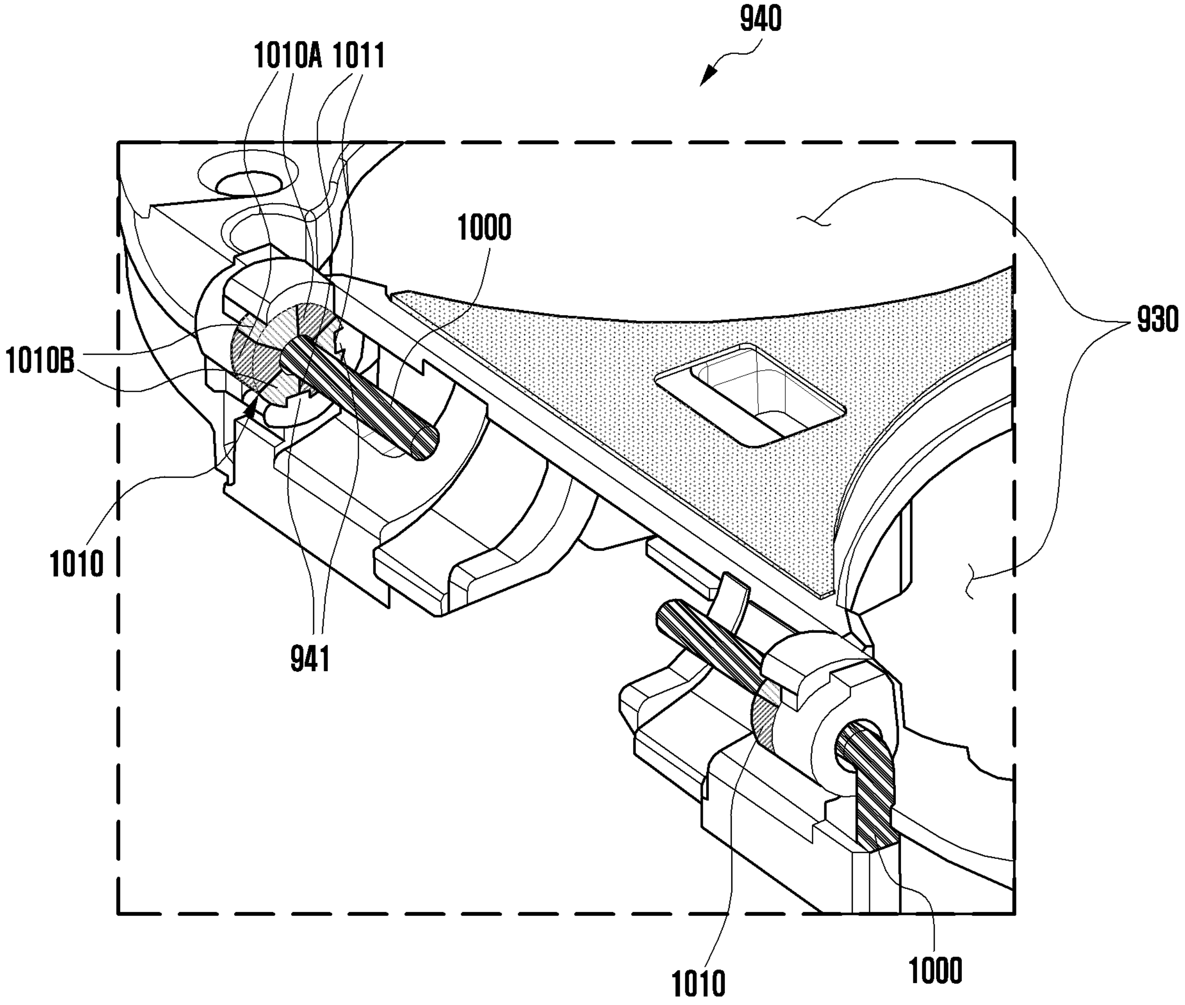
FIG. 10A is a diagram illustrating a connection part and a peripheral configuration thereof according to an embodiment.
Figure 10B:
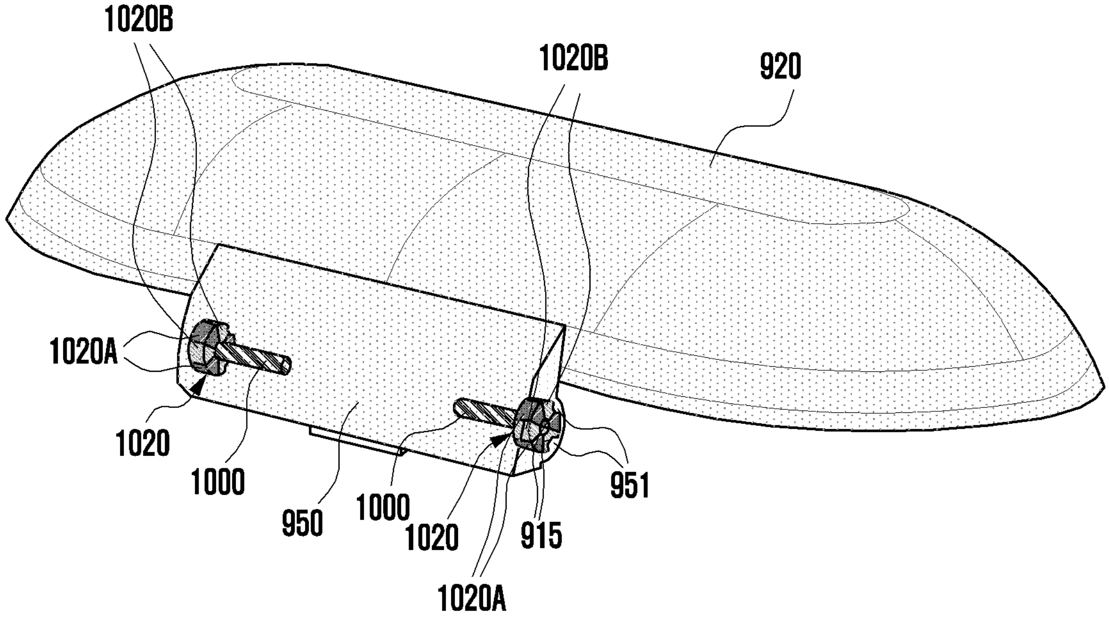
FIG. 10B is a diagram of a connection part and a peripheral configuration thereof according to an embodiment.
Figure 11A:
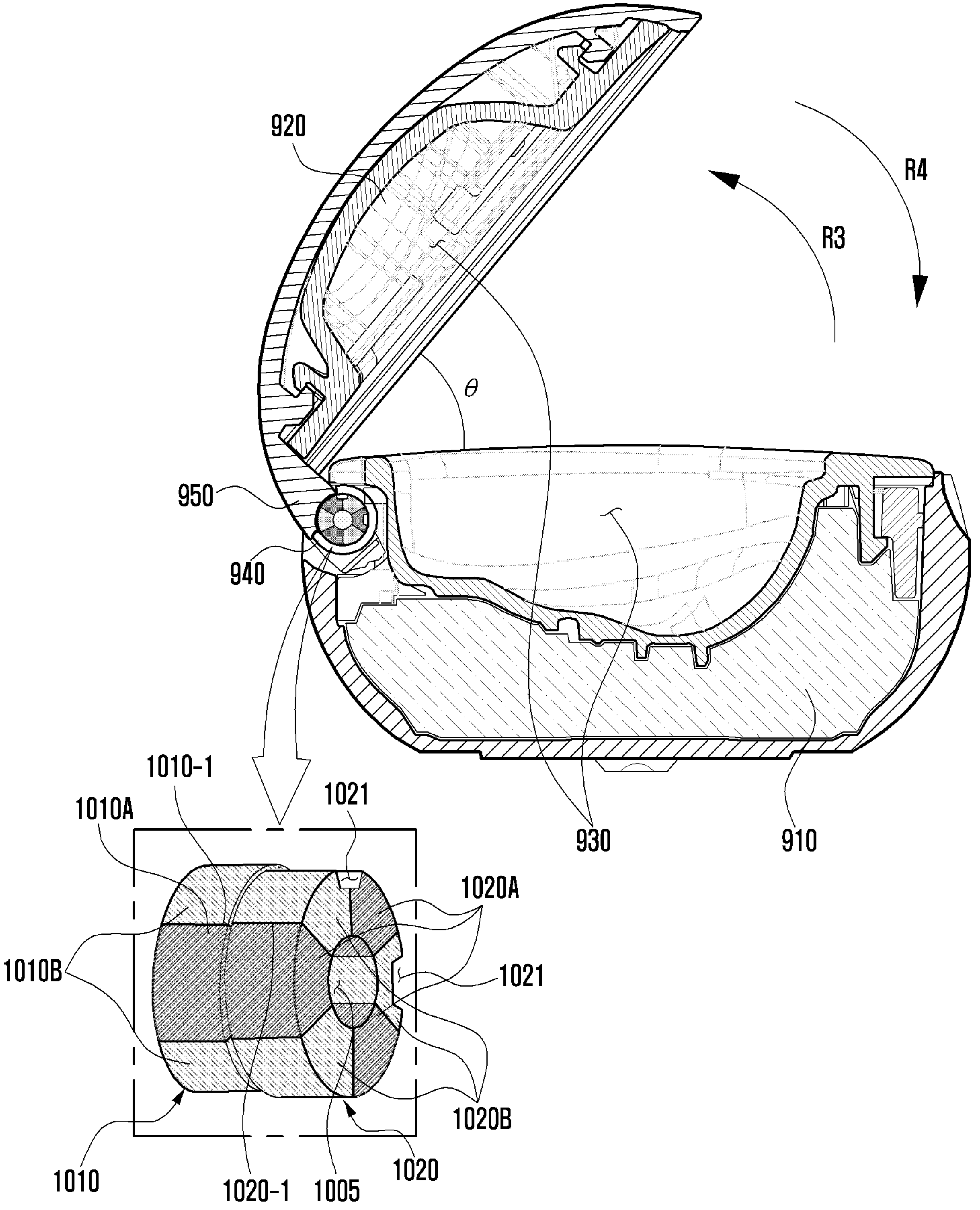
FIGS. 11A, 11B and 11C are diagrams illustrating a positional relationship between components according to an operating state of an electronic device case according to an embodiment.
Figure 11B:
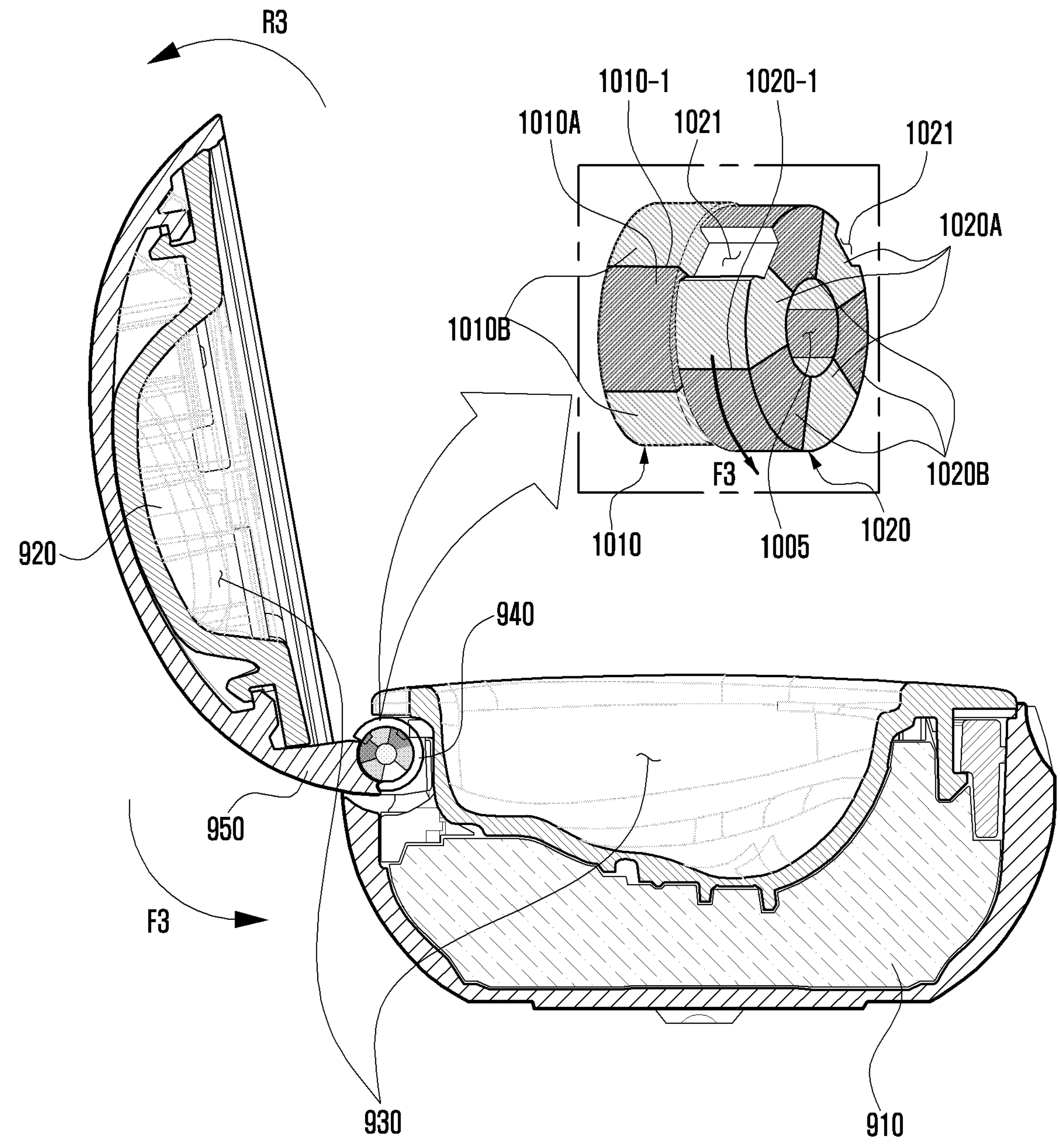
Figure 11C:
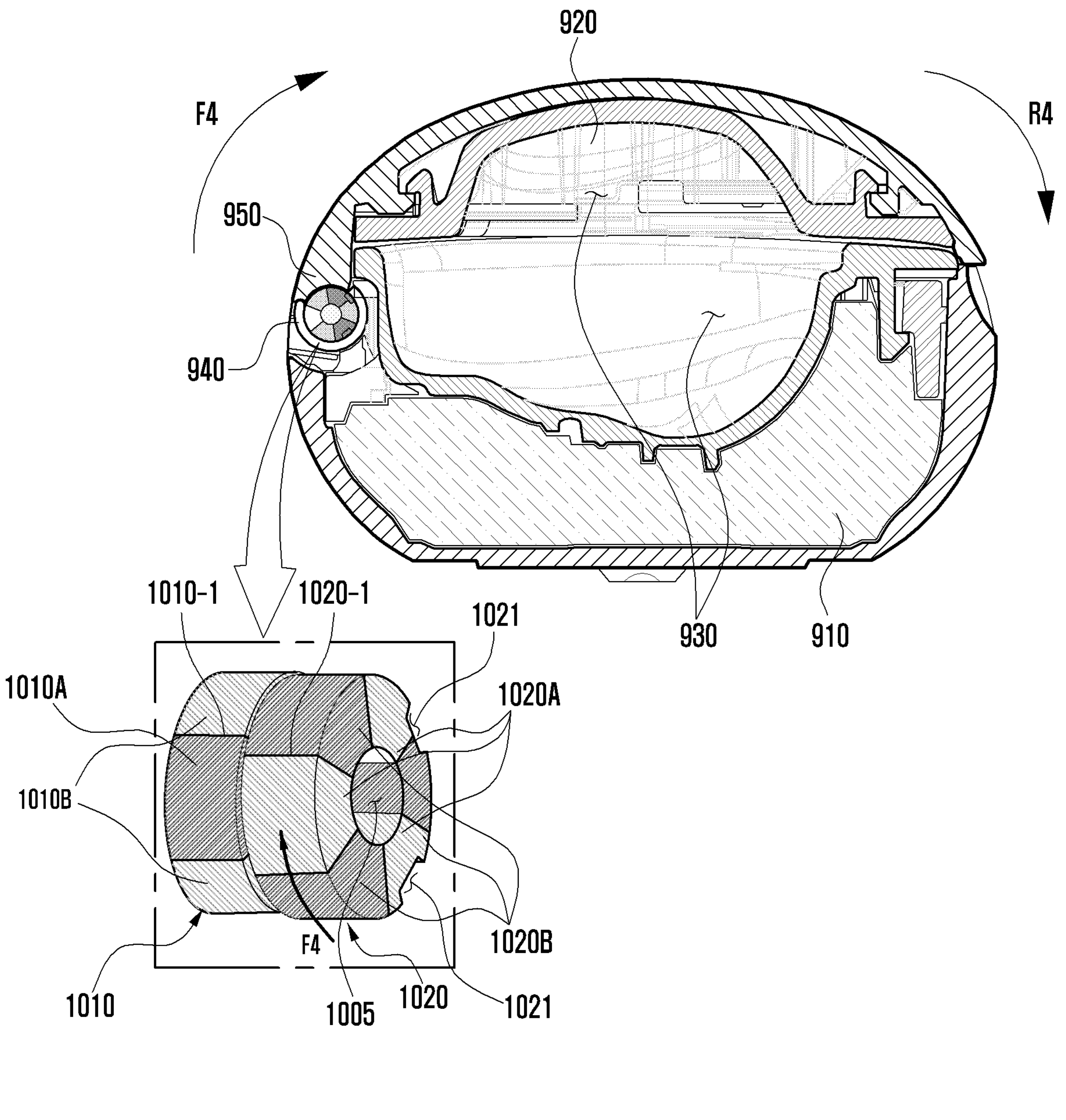

FIG. 9 is a diagram of an electronic device case according to an embodiment. FIG. 10A is a diagram illustrating a connection part and a peripheral configuration thereof according to an embodiment. FIG. 10B is a diagram of a connection part and a peripheral configuration thereof according to an embodiment. FIGS. 11A, 11B and 11C are diagrams illustrating a positional relationship between components according to an operating state of an electronic device case according to an embodiment.

Referring to FIGS. 9, 10A, 10B, 11A, 11B, and 11C, according to various embodiments, an electronic device case 900 shown in FIG. 9 may be a case capable of accommodating an electronic device (e.g., the electronic device 101 of FIG. 2), similar to the electronic device case 200 described with reference to FIG. 2. A first body 910 and a second body 920 may move relative to each other to open or close a space 930 in which an electronic device can be accommodated.

According to various embodiments, a first connection part 940 may be coupled to the first body 910. The first connection part 940 may be integrally formed with the first body 910, or may be separately formed and coupled to the first body 910 in various ways.

According to various embodiments, a second connection part 950 may be coupled to a second body 920. The second connection part 950 may be integrally formed with the second body 920, or may be separately formed and coupled to the second body 920 in various ways.

According to various embodiments, the second connection part 950 may be movably connected with respect to the first connection part 940. When the second connection part 950 moves with respect to the first connection part 940, the second body 920 coupled to the second connection part 950 may move relative to the first body 910 coupled to the first connection part 940. In this case, the movement may include both a linear movement and a non-linear movement. In one embodiment, the second connection part 950 may be connected to the first connection part 940 through a hinge connection. Referring to FIGS. 10A and 10B, a hinge shaft 1000 may pass through the first connection part 940 and the second connection part 950. The second connection part 950 rotates with respect to the first connection part 940 by using, as a rotation axis, the hinge shaft 1000 inserted into the first connection part 940 and the second connection part 950, so that the second connection part 950 may move with respect to the first connection part 940.

According to various embodiments, a first magnet 1010 may be fixed on the first connection part 940. The first magnet 1010 may include various types of magnets. For example, as shown in FIGS. 10A and 11A, the first magnet 1010 may be in the form of a circular magnet. A hole 1005 through which the hinge shaft 1000 can pass may be formed through the central portion of the first magnet 1010. In the first magnet 1010 may include first regions 1010A having a first polarity (e.g., N pole) and second regions 1010B having a second polarity (e.g., S pole), which are alternately arranged along the circumferential direction. For example, as shown in FIGS. 10A and 11A, the first magnet 1010 may include three first regions 1010A and three second regions 1010B. In this case, one first region 1010A may be a region corresponding to a part (e.g., 60 degrees) of the circumference of the first magnet 1010, and one second region 1010B may be a region corresponding to a part (e.g., 60 degrees) of the circumference of the first magnet 1010. The shapes of the first region 1010A and the second region 1010B are merely examples and may be variously changed.

According to various embodiments, a second magnet 1020 may be fixed on the second connection part 950. The second magnet 1020 may include various types of magnets. For example, as shown in FIGS. 10B and 11A, the second magnet 1020 may be in the form of a circular magnet. A hole 1005 through which the hinge shaft 1000 can pass may be formed through the central portion of the second magnet 1020. In the second magnet 1020 may include first regions 1020A having a first polarity (e.g., N pole) and second regions 1020B having a second polarity (e.g., S pole), which are alternately arranged along the circumferential direction. For example, as shown in FIGS. 10A and 11A, the second magnet 1020 may include three first regions 1020A and three second regions 1020B. In this case, one first region 1020A may be a region corresponding to a part (e.g., 60 degrees) of the circumference of the second magnet 1020, and one second region 1020B may be a region corresponding to a part (e.g., 60 degrees) of the circumference of the second magnet 1010. The shapes of the first region 1020A and the second region 1020B are merely examples and may be variously changed.

According to various embodiments, at least one first groove 1011 may be formed on the first magnet 1010. The first groove 1011 may be a recess formed concavely on the first magnet 1010. A first protrusion 941 corresponding to the first groove 1011 of the first magnet 1010 may be formed on the first connection part 940 to which the first magnet 1010 is fixed. When the first magnet 1010 is placed on the first connection part 940, the first protrusion 941 may be inserted into the first groove 1011 of the first magnet 1010. The first magnet 1010 may be fixed to the first connection part 940 by a corresponding structure of the first groove 1011 and the first protrusion 941.

According to various embodiments, at least one second groove 1021 may be formed on the second magnet 1020. The second groove 1021 may be a recess formed concavely on the second magnet 1020. A second protrusion 951 corresponding to the second groove 1021 of the second magnet 1020 may be formed on the second connection part 950 to which the second magnet 1020 is fixed. When the second magnet 1020 is placed on the second connection part 950, the second protrusion 951 may be inserted into the second groove 1021 of the second magnet 1020. The second magnet 1020 may be fixed to the second connection part 950 by a corresponding structure of the second groove 1021 and the second protrusion 951.

According to various embodiments, the first magnet 1010 is fixed on the first connection part 940, and the second magnet 1020 may be fixed on the second connection part 950, so that a positional relationship between the first magnet 1010 and the second magnet 1020 may change when the second connection part 950 moves relative to the first connection part 940.

According to various embodiments, an opened or closed state of an accommodating space 930 surrounded by the first body 910 and the second body 920 may change due to movement of the second connection part 950 with respect to the first connection part 940. Hereinafter, a state in which the accommodating space 930 is fully opened is referred to as a first state (e.g., the state illustrated in FIG. 11B), a state in which the accommodating space 930 is completely closed is referred to as a second state (e.g., the state illustrated in FIG. 11C), and an intermediate state between the first state and the second state is referred to as a third state (e.g., the state illustrated in FIG. 11A). In another embodiment, the first state may refer to a state having the largest angle between the first body 910 and the second body 920, the second state may refer to a state having the smallest angle between the first body 910 and the second body 920, and the third state may refer to an intermediate state between the first state and the second state. In still another embodiment, based on a path along which the second connection part 950 moves with respect to the first connection part 940, the first state and the second state may refer to when the second connection part 950 reaches points at which the same can no longer move with respect to the first connection part 940, and the third state may refer to a state where the second connection part 950 is located at a any point on a path along which the second connection part 950 moves with respect to the first connection part 940.

According to various embodiments, as shown in FIGS. 11A to 11C, the first magnet 1010 and the second magnet 1020 in which the first regions 1010A and 1020A having a first polarity (e.g., N pole) and the second regions 1010B and 1020B having a second polarity (e.g., S pole) are alternately arranged along the circumferential direction may be disposed to face each other. In this state, respective portions (e.g., the first region and the second region) of the first magnet 1010 and the second magnet 1020, which have different polarities, may be attracted to face each other such that the attractive and repulsive forces acting between the magnets balance each other. When the first magnet 1010 is fixed, the magnetic force between the first magnet 1010 and the second magnet 1020 may act as a rotational force for rotating the second magnet 1020 with respect to the first magnet 1010. By this rotational force, the electronic device case 900 may maintain a state where the same reaches the first state or the second state, or may be naturally transitioned from the third state to the first state or the second state according to the direction of the external force.

According to various embodiments, as shown in FIG. 11A, in the third state, the first magnet 1010 and the second magnet 1020 may face each other in a state where the regions 1010A and 1010B having the same polarity are aligned with each other. The first region 1010A of the first magnet 1010 and the first region 1020A of the second magnet 1020 may face each other in an aligned state. Here, facing in an aligned state means that the first magnet 1010 and the second magnet 1020 face each other in a state where the boundary 1010-1 between the first region 1010A and the second region 1010B of the first magnet 1010 coincides with the boundary 1020-1 between the first region 1020A and the second region 1020B of the second magnet 1020, as shown in FIG. 11A. In this state, a magnetic force may act between the first magnet 1010 and the second magnet 1020 in a direction to repel each other, but the first magnet 1010 and the second magnet 1020 may be fixed by the first connection part 940 and the second connection part 950, respectively, and thus cannot move, thereby forming the most unstable state. In this state, depending on the direction of the external force applied to the second body 920, the accommodating space 930 may be fully opened (e.g., the first state shown in FIG. 11B) or the accommodating space 930 may be completely closed (e.g., the second state shown in FIG. 11C). For example, when an external force is applied to the second body 920 in the first direction (R3), the second magnet 1020 may rotate in the first direction (R3) with respect to the first magnet 1010, thereby entering the first state. In addition, when an external force is applied to the second body 920 in the second direction (R4), the second magnet 1020 may rotate in the second direction (R4) with respect to the first magnet 1010, thereby entering the second state.

For example, when the electronic device case 900 has crossed the third state in a transition process to the opened state (first state) from the closed state (second state), the electronic device case 900 may be transitioned to the first state due to the rotational force generated by the magnetic force acting between the first magnet 1010 and the second magnet 1020 even without external force applied to the electronic device case. In addition, when the electronic device case 900 has crossed the third state in a transition process to the closed state (second state) from the opened state (first state), the electronic device case 900 may be transitioned to the second state due to the rotational force generated by the magnetic force acting between the first magnet 1010 and the second magnet 1020 even without external force applied to the electronic device case 900.

According to various embodiments, in the first state and the second state, the first magnet 1010 and the second magnet 1020 may be disposed such that regions 1010A and 1020B having the same polarity are misaligned from each other. That is, the first region 1010A of the first magnet 1010 and the first region 1020A of the second magnet 1020 may be misaligned from each other. For example, as shown in FIGS. 11B and 11C, the boundary 1010-1 between the first region 1010A and the second region 1010B of the first magnet 1010 may be misaligned from the boundary 1020-1 of the first region 1020A and the second region 1020B of the second magnet 1020 at a predetermined angle. In this state, the rotational force due to the magnetic force acting between the first magnet 1010 and the second magnet 1020 may allow the first state and the second state to be maintained. For example, referring to FIG. 11B, the rotational force (F3) may act between the first magnet 1010 and the second magnet 1020 in the first state. A magnetic force may act in a direction to arrange the different polarities in an aligned state, between the first magnet 1010 and the second magnet 1020 in which respective portions thereof having the same polarity are misaligned from each other, and thus a rotational force may act to rotate the second magnet 1020 with respect to the first magnet 1010. In the first state, the rotational force (F3) acting between the first magnet 1010 and the second magnet 1020 may be transferred to the second connection part 950 to act in a direction (R3) in which the electronic device case is opened. Since the path along which the second connection part 950 can move with respect to the first connection part 940 is limited, the magnetic force (F3) acting between the first magnet 1010 and the second magnet 1020 may enable the electronic device case 900 to maintain the first state. Referring to FIG. 11C, the rotational force (F4) may act between the first magnet 1010 and the second magnet 1020 in the second state. In the second state, the rotational force (F4) acting between the first magnet 1010 and the second magnet 1020 may be transferred to the second connection part 950 to act in the direction (R4) in which the electronic device case 900 is closed. Since the path along which the second connection part 950 can move with respect to the first connection part 940 is limited, the magnetic force (F4) acting between the first magnet 1010 and the second magnet 1020 may enable the electronic device case 900 to maintain the second state.

As described herein, the electronic device case 900 may be configured to maintain the first state and the second state only with the first magnet 1010 and the second magnet 1020 without a separate magnet for maintaining the first state and/or the second state. In summary, the first magnet 1010 and the second magnet 1020 may assist an opening or closing process of the electronic device case 900 and allow the electronic device case 900 to maintain the opening and closing thereof.

Figure 12:
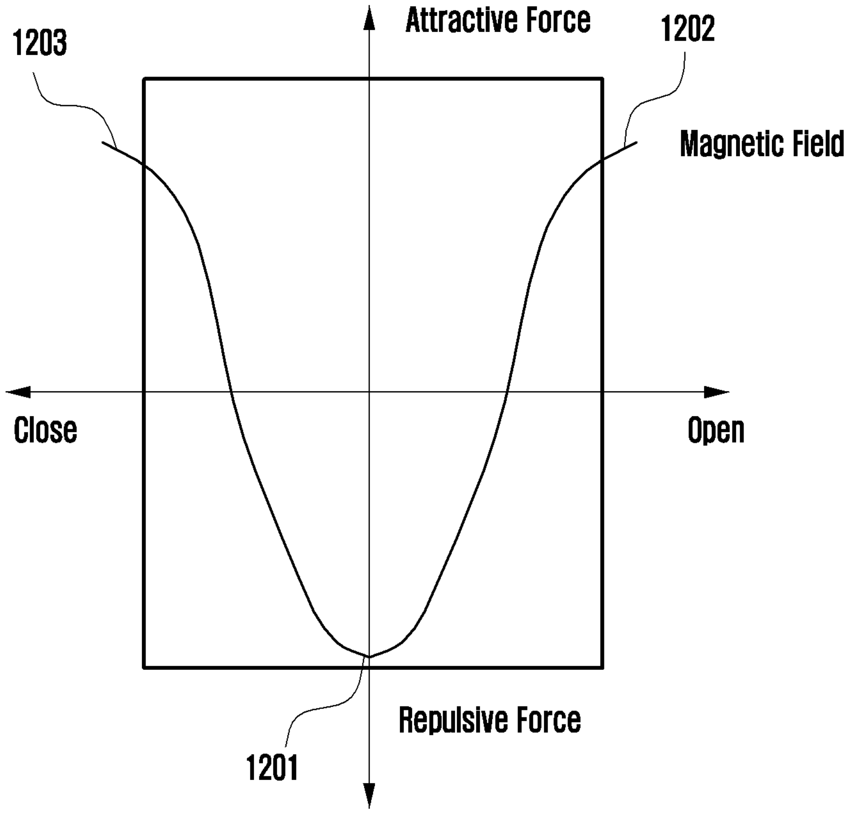
FIG. 12 is a graph showing a magnetic force acting between magnets in states of an electronic device case according to an embodiment.

FIG. 12 is a graph showing a magnetic force acting between magnets in states of an electronic device case according to an embodiment.

According to various embodiments, the greatest magnetic force may act between the first magnet 1010 and the second magnet 1020 in the third state 1201 (e.g., the state illustrated in FIG. 11A). In this state, depending on a direction of an external force applied to the second magnet 1020 through the second connection part 950 (assuming that the first connection part 940 and the first body 910 are fixed), the electronic device case may be transitioned to the first state (e.g., the state illustrated in FIG. 11B) or the second state (e.g., the state illustrated in FIG. 11C). Due to the rotational force generated by the magnetic force acting on the first magnet 1010 and the second magnet 1020, the electronic device case may be transitioned to the first state or the second state even if a continuous external force is not provided thereto.

According to various embodiments, the first magnet 1010 and the second magnet 1020 may be misaligned in the first state and the second state. In this state, the first state and the second state may be maintained due to the rotational force generated by the magnetic force acting between the first magnet 1010 and the second magnet 1020.

Although the embodiments of the disclosure have been described with reference to the drawings, various modifications and changes may be made by those of skill in the art from the above description. For example, suitable results may be obtained even when the described techniques are performed in a different order, or when components are coupled or combined in a different manner, or replaced or supplemented by other components or their equivalents.

The invention claimed is:

1. An electronic device case comprising:

a first body;

a first connection part coupled to the first body;

a second body;

a second connection part coupled to the second body;

a hinge structure connected to the first connection part and the second connection part;

an accommodating space formed by the first body and the second body;

a first magnet disposed within the first connection part and configured to rotate together with the first connection part; and a second magnet disposed within the second connection part and configured to rotate together with the second connection part;

wherein the electronic device case is transitioned, by movement of the second connection part with respect to the first connection part, to one of a first state in which the accommodating space is opened, a second state in which the accommodating space is closed, and a third state between the first state and the second state, and wherein, in the third state, the first magnet and the second magnet are arranged such that a portion of the second magnet having a polarity faces a portion of the first magnet having the same polarity as the portion of the second magnet.

2. The electronic device case of claim 1, wherein in the first state, the first magnet and the second magnet are positioned such that the portion of the first magnet and the portion of the second magnet are misaligned from each other, and the first state is maintained by a repulsive force acting between the first magnet and the second magnet, and wherein in the second state, the first magnet and the second magnet are positioned such that the portion of the first magnet and the portion of the second magnet are misaligned with each other and the second state is maintained by a repulsive force acting between the first magnet and the second magnet.

3. The electronic device case of claim 1, wherein each of the first magnet and the second magnet is a bar magnet, and wherein, in the third state, the first magnet and the second magnet are positioned such that a surface of the portion of the first magnet and a surface of the portion of the second magnet are parallel to each other.

4. The electronic device case of claim 1, wherein in the first state and the second state, the first magnet and the second magnet are positioned such that a surface of the portion of the first magnet and a surface of the portion of the second magnet face different directions.

5. The electronic device case of claim 1, wherein the first magnet comprises a first groove provided in a surface thereof, and the first connection part comprises a first protrusion inserted in the first groove of the first magnet, and wherein the second magnet comprises a second groove provided in a surface thereof, and the second connection part comprises a second protrusion inserted in the second groove of the second magnet.

6. The electronic device case of claim 5, wherein the first groove of the first magnet is offset from a center of the first magnet, and wherein the second groove of the second magnet is offset from a center of the second magnet.

7. The electronic device case of claim 1, further comprising an opening/closing sensor provided on the first connection part and configured to generate different signals according to the first state, the second state, and the third state based on a change in a magnetic field.

8. The electronic device case of claim 1, further comprising a foreign material storage space provided between the first connection part and the second connection part.

9. The electronic device case of claim 8, wherein a first surface of the second connection part protrudes farther than a second surface of the second magnet such that the foreign material storage space is surrounded by the first connection part, the second connection part, and the second magnet.

10. The electronic device case of claim 1, further comprising a first buffer member provided on least one of the first connection part and the second connection part at a position corresponding to where the first connection part and the second connection part are in contact with each other in the first state.

11. The electronic device case of claim 1, further comprising a second buffer member provided on at least one of the first connection part and the second connection part at a position corresponding to where the first connection part and the second connection part are in contact with each other in the second state.

12. The electronic device case of claim 1, further comprising a hinge shaft, wherein each of the first magnet and the second magnet has a hole at a central portion thereof and through which the hinge shaft passes, wherein each of the first magnet and the second magnet is a circular magnet comprising first regions having a first polarity and second regions having a second polarity that is different than the first polarity, and the first regions and the second regions are alternately arranged in a circumferential direction, and wherein the first magnet and the second magnet are arranged to face each other.

13. The electronic device case of claim 12, wherein the first magnet comprises a first groove provided in a surface thereof, and the first connection part comprises a first protrusion inserted in the first groove of the first magnet to fix the first magnet to the first connection part, and wherein the second magnet comprises a second groove provided in a surface thereof, and the second connection part comprises a second protrusion inserted in the second groove of the second magnet to fix the second magnet to the second connection part.

14. The electronic device case of claim 12, wherein, in the third state, a first region of the first magnet and a first region of the second magnet are aligned to face each other.

15. The electronic device case of claim 12, wherein, in the first state and the second state, a first region of the first magnet and a first region of the second magnet face each other in a misaligned state.

* * * * *